United States Patent [19]

McCombs

[11] 4,373,938

[45] Feb. 15, 1983

[54] MODULAR INDUSTRIAL OXYGEN CONCENTRATOR

[75] Inventor: Norman R. McCombs, Tonawanda, N.Y.

[73] Assignee: Greene & Kellogg, Incorporated, Tonawanda, N.Y.

[21] Appl. No.: 301,292

[22] Filed: Sep. 11, 1981

[51] Int. Cl.³ .......................................... B01D 53/04
[52] U.S. Cl. ...................................... 55/160; 55/179; 55/387; 55/389
[58] Field of Search ............... 55/33, 74, 75, 160–163, 55/179, 180, 387, 389

[56] References Cited

U.S. PATENT DOCUMENTS

| | | | |
|---|---|---|---|
| 2,625,237 | 1/1953 | Gribler et al. | 55/179 X |
| 3,164,452 | 1/1965 | Westeren et al. | 55/179 X |
| 3,258,899 | 7/1966 | Coffin | 55/179 X |
| 3,323,291 | 6/1967 | Kern | 55/179 X |
| 3,323,292 | 6/1967 | Brown | 55/179 X |
| 3,543,482 | 12/1970 | Foster | 55/179 X |
| 3,594,990 | 7/1971 | Hawley | 55/162 |
| 4,194,890 | 3/1980 | McCombs et al. | 55/179 X |
| 4,263,018 | 4/1981 | McCombs et al. | 55/179 X |
| 4,302,224 | 11/1981 | McCombs et al. | 55/179 X |

FOREIGN PATENT DOCUMENTS 2924052  12/1980  Fed. Rep. of Germany ........ 55/179

*Primary Examiner*—Robert H. Spitzer
*Attorney, Agent, or Firm*—Browdy & Neimark

[57] ABSTRACT

An improved pressure swing adsorption device built using a modular concept and comprising a surge tank unit and a combined bed and control unit, each of those units being separately replaceable and separately usable. The valves and other controls are constructed in a modular manner and fit onto the beds such that they are readily and easily replaced without dissembling the entire control apparatus. Numerous other features and advantages are provided to all together produce a highly reliable easily serviceable and relatively low cost to manufacture device.

39 Claims, 5 Drawing Figures

MODULAR INDUSTRIAL OXYGEN CONCENTRATOR

This invention relates to the separation of mixtures of gases, and particularly air, into its component parts. The invention provides machinery for carrying out pressure swing adsorption techniques to accomplish this goal. The invention has been successfully embodied into industrial equipment for producing high purity oxygen enriched air. The invention can also be used to separate or concentrate hydrogen, helium, water vapor or other gases out of various mixtures of gases.

Pressure swing adsorption is well known in the art, for example, reference can be had to the inventor's prior U.S. Pat. Nos. 4,263,018 and 4,194,890 which disclose and claim particular pressure swing adsorption techniques. However, very briefly, pressure swing adsorption usually involves air at high pressure which is delivered to one of two beds of adsorbent material, with one bed being on production of that gas in the mixture which passes through the bed most rapidly, while the second bed is being back flushed with a side stream of the product from the first bed. When the first bed in about saturated with the slower moving gas component, then the beds reverse and the second bed goes on production while the first bed goes on regeneration. The present invention is adaptable for use with many such systems and techniques which are known in the art, or which may be invented in the future.

More in particular, the invention is concerned with the equipment used to carry out such techniques itself. Recently there has developed a market for pressure swing adsorption machines to produce oxygen in marine applications, such as on off-shore oil rigs, boats at sea, and the like. The demands of this environment are considerably more harsh than are those in land based environments. In addition, the reliability requirement is critical, that is, the gas must be present when needed because of the high cost of operating in such marine environments. The invention includes several unique approaches to meet the demands of this usage, which include an overall modular approach to manufacture. This modular idea extends to the manner in which the manifolds are assembled in the control housing, the manner in which the adsorption beds are joined to the surge tank, the manner in which the control cabinet internal space is made pressure positive with exhaust gas, and other concepts to permit application of pressure swing adsorption techniques into the new area. In addition to other advantages, the modular approach facilitates weatherproofing of the invention apparatus.

Thus the objects of the invention include the provision of a machine of the character described which will operate in marine and other hostile environments, and which will permit a modular approach to assembly, repair, and use of the invention in such environments. The invention provides a machine of the character described which achieves the above advantages and which provides a highly reliable, relatively low cost and efficient device to meet the goals of the invention.

The above and other advantages of the invention will be pointed out or will become evident in the following detailed description and claims, and in the accompanying drawing also forming a part of this disclosure, in which:

Figure 1:
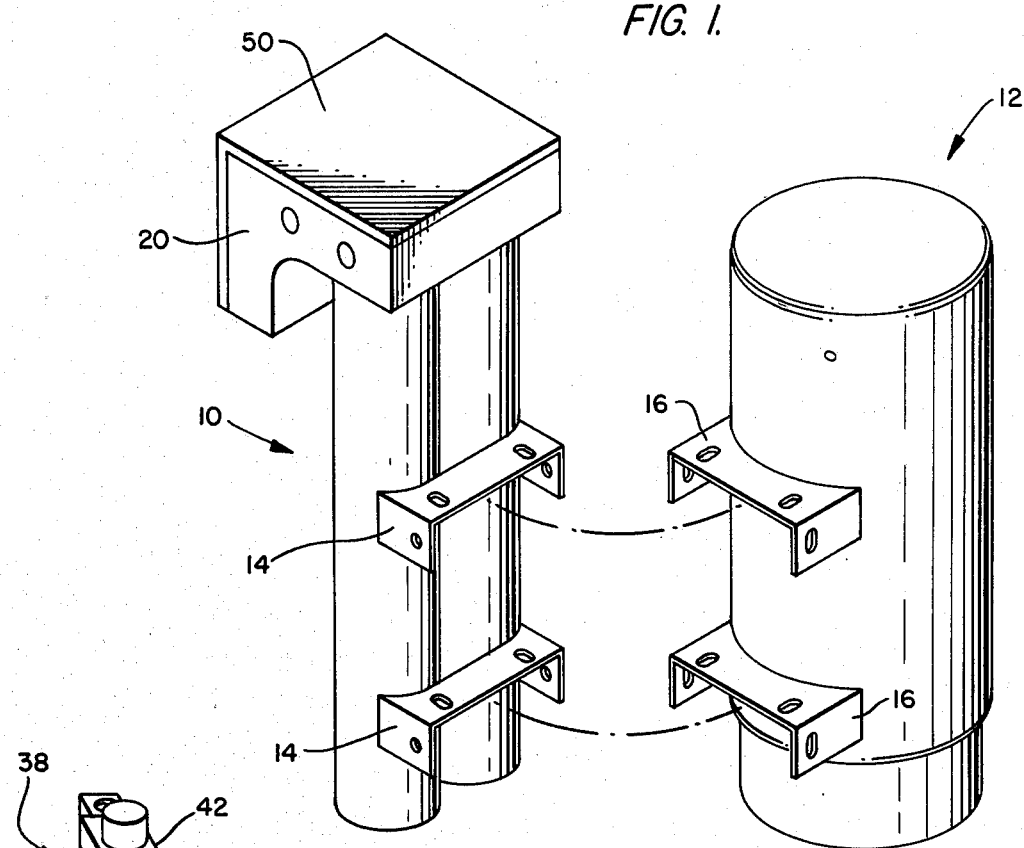
FIG. 1 is a perspective view showing the manner in which the surge tank unit and the combined bed and control unit fit together.

Referring now in detail to the drawings, in FIG. 1 there is shown a successfully constructed embodiment which comprises a combined bed and control unit 10 and a surge tank unit 12.

The invention can be used with or without the mating surge tank 12. A surge tank is required where a smooth continuous delivery of oxygen is required. Absent the surge tank there would be pulsations in the delivery line as the beds switched back and forth under the control of the particular pressure swing adsorption (PSA) cycle in use by the equipment. However, a number of bed and control units 10 could be ganged to a single surge tank, or the pulsations could be tolerated if they were not objectionable in any particular environment.

The two units 10 and 12 are joined together by a pair of brackets 14 and 16 mounted thereon, respectively. The brackets 14 and 16 are of similar configuration and fit together by one nesting within and under the other. The various holes and slots in the two brackets, as shown in the drawings, facilitate their assembly and disassembly together, and adjusting their relative positions.

The brackets 14 and 16 add to the versatility of the invention and its overall modular approach in that they permit separate manufacture and separate handling during manufacture of the two units 10 and 12, as well as providing the advantages and versatility described in the paragraph above, plus other advantages, such as permitting the user to retain whichever unit is still functional in the event of a failure of a companion unit.

Figure 3:
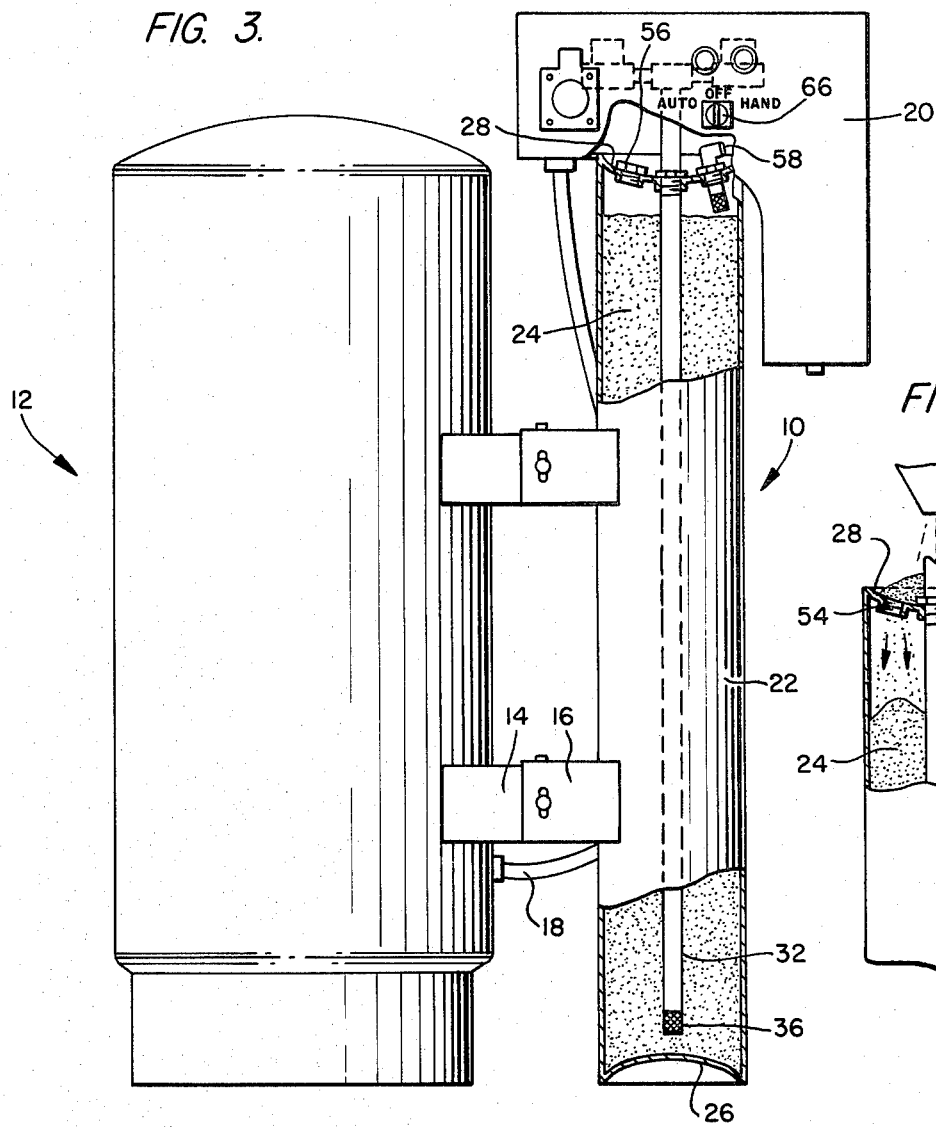
FIG. 3 is a side elevational view of the successfully constructed embodiment, shown assembled and with some parts broken away and in cross section.

Units 10 and 12 are functionally interconnected by a hose 18 shown in FIG. 3, which delivers the oxygen enriched air from the beds in control unit 10 to the tank 12. Other means not shown ar provided to tap the supply of oxygen enriched air within the tank 12 in any suitable manner well known to those skilled in these arts.

Unit 10 comprises a control housing 20 which is mounted on top of a pair of tanks 22 which are filled with adsorbent material 24. Any suitable molecular sieve, as a granular sand-like material can be used, such as silica gel, molecular sieves, carbon, certain oxides, and other substances known to those skilled in the arts.

The invention can be used with one, three or other numbers of beds by simply providing an appropriate number of tanks to house such beds in unit 10.

Figure 2:
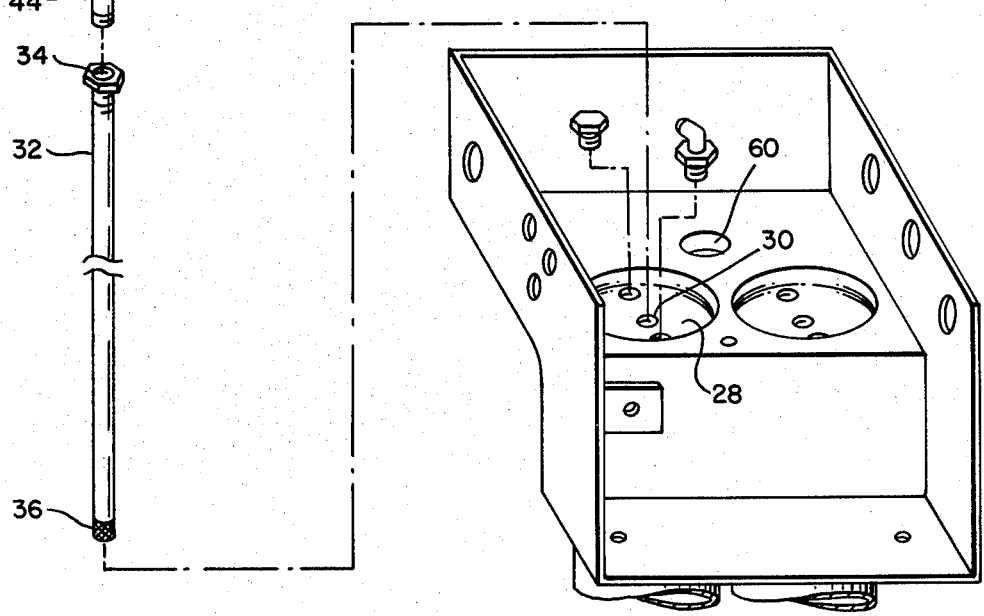
FIG. 2 is an exploded view showing the manner in which a part of the apparatus is assembled.
Figure 4:
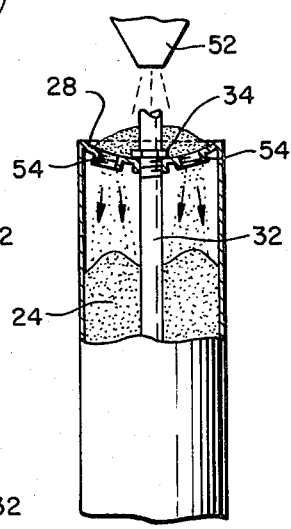
FIG. 4 is a partial view showing the manner in which the beds are filled with the molecular sieve material.

As shown in FIGS. 2 and 3, the beds 22 are housed in pressure tanks comprising a cylindrical structure with inverted top and bottom end caps 28 and 26 respectively. Both top and bottom end caps 28 and 26 are joined to the cylindrical body of the bed in an inverted, domed curved side facing in, manner, for purposes of saving space inside the cabinet, facilitating standing of the unit on the floor, and for facilitating filling, as shown in FIG. 4 and will be explained below.

Figure 5:
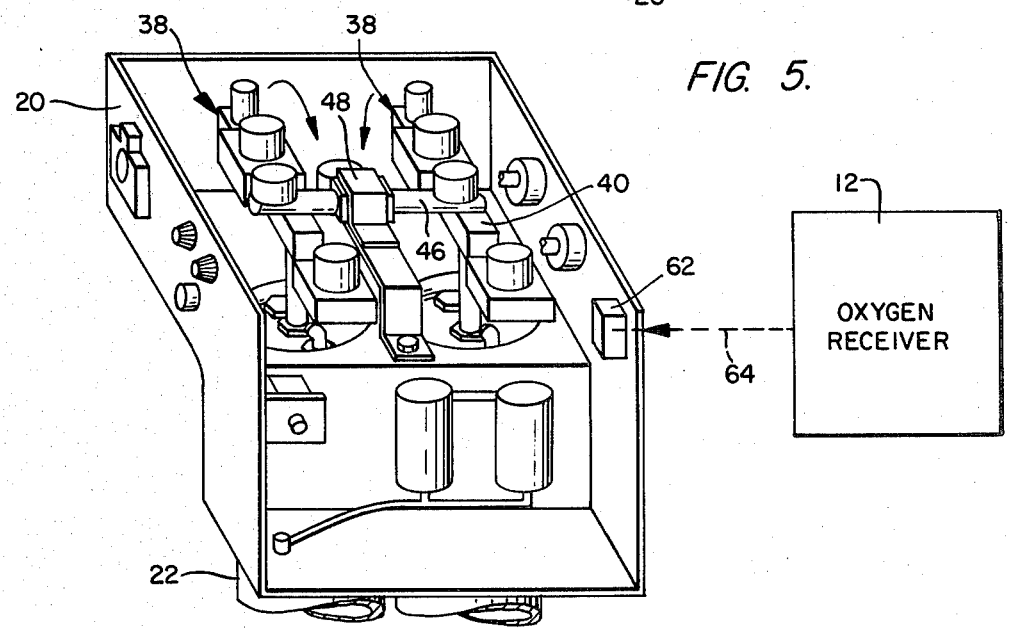
FIG. 5 is a perspective view of the control cabinet with the cover removed.

Referring to FIGS. 2, 3 and 5, the control cabinet 20 is of generally "L" shaped configuration in side elevational view. These Figures also illustrate the overall modular approach of the invention as applied to the assembly of the operative parts in the control cabinet. Each top end cap 28 is provided with an opening 30 in which is mounted a pipe 32 by means of a fitting 34 which cooperates with suitable mounting and sealing means in the central opening 30. A filter 36 is provided at the end of the pipe 32 to be positioned at the lower end of the bed, as appears in FIG. 3.

The overall modular approach of the invention also includes the use of valve and manifold subassemblies 38, which are also called "valve and flow conduit" modules in the specification and claims herein. Each module 38 comprises a central mounting and distribution block 40 on which is mounted a pair of electrically operated solenoid valves 42 by means of stub connectors, and a vertical stub connector 44 to connect the entire subassembley 38 to the pipe 32 via the fitting 34. Since the particular valve arrangements, electrical circuitry, and the like required by any particular (PSA) cycle with which the invention can be used does not form a material part of the present invention, the drawings have been simplified by omitting many of the components and all of the interconnections, both electrical and pneumatic which will be, of course, provided in order to make an operative system. Referring to FIG. 5, a pair of the subassemblies 38 are provided, and they are interconnected to each other by a cross manifold module 46 which connects to the central distribution block 40 of the two subassemblies or manifold modules 38. Bracket means 48 secured to the bottom of the cabinet 20 are provided to hold the module 46 in place across the two valve modules 38.

The module 46 is similar to the modules 38 in that it comprises valve distribution blocks and stub pipe fittings and the like.

As is well known to those skilled in these arts, the valves control all the various gas flows, air in, oxygen out, nitrogen out, purge and so forth, al under the control of and as required by the particular (PSA) cycle in use.

The advantages of the modular approach comprising the subassemblies 38 and 46 include that they permit assembly line like production in the plant, thus effecting economies of manufacture, and consistency of quality. Further, once in the field, they permit servicing in that the user can keep on hand a few extra modules of different types and simply replace one that fails without going into a lot of investigation and diagnosis as to which particular valve or fitting or the like failed. The thinking is analagous to the electronic arts wherein complex circuits are reduced to a plurality of circuit boards, and in the event of failure an entire board is replaced, with the diagnosis and repair taking place at a later date at the convenience of the user and the manufacture. The net result is that reliability is greatly enhanced while servicing time is reduced and simplified.

Because of the marine and other hostile environments in which the invention used, the control cabinet 20 is provided with a lid 50 which is secured in place by a suitable weatherproof means, not shown in detail but well known to those skilled in these arts.

Referring now to FIG. 4, the manner of filling the bed 22 with the adsorbent material 24 is shown. The top cap 28 is provided with three threaded openings, the center one of which receives the pipe 32 via fitting 34 as described above. The other two openings are the same, and are open as shown in FIG. 4 for receiving a molecular sieve material from a funnel or other delivery means 52. The pipe 32 and fitting 34 are first mounted in place, and then the tanks filled with molecular sieve 24 via the remaining two openings 54 in the cap 28. The provision of two openings speeds up the manufacturing process in that the sieve material fills the tank twice as fast as it would through one such opening. After the tank is full, one of the openings 54 is sealed by a plug 56, and the other opening receives a filtered connector member 58 to which a hose to deliver gas to and from the bed is attached, the hose being omitted for the sake of clarity, as set forth above.

In addition to the advantages set forth above, this "upside down" mounting of the end caps 28 in the cabinet 20 also provides additional room for the workers' hands when assembling the various parts inside the cabinets.

Means are also provided to maintain a pressure within the control cabinet 20 greater than that of the ambient atmosphere. This assures that the sea air or other hostile environment will not enter as readily into the cabinet, thus protecting the components therein from deterioration from such hostile environments. To this end, the bottom of the cabinet is provided with an opening in which is mounted a fitting 60, see FIG. 2. Referring to FIG. 5, the arrows at the rear of the cabinet indicate the spilling or exhausting of waste gas, primarily nitrogen, out of the manifold modules 38 to fill the space within the cabinet, which is of course sealed in an air tight manner in use, and showing the exiting of this waste gas through the fitting 60. In this manner, the inside of the control space 20 is at a pressure higher than that of the ambient atmosphere. If desired, a protective hose or short length of pipe, not shown, can be mounted to the outside of the fitting 60 for the purpose of preventing foreign matter from entering upwardly through fitting 60 into the cabinet space.

The invention also includes a pressure demand switch 62 mounted on the inside of the cabinet. Line 64 indicates a feedback signal from the oxygen receiver, which may be the tank 12, to this switch 62 to prevent the occurrence of excess pressure in the system. As is known, the switch 62 will shut the system down when the pressure within the oxygen receiver, tank 12 or equivalent, exceeds predetermined limits. Mounting of the switch within the protected space inside the cabinet is an improvement of the invention over the prior art which has used such pressure demand switches.

Means are also provided to bypass the function of switch 62, if that should be needed in ay particular environment. To this end, a manual three position switch 66 is provided on one side of the cabinet, as shown in FIG. 3. This switch allows the device to be operated in either "auto" wherein the pressure switch 62 operates as set forth above, or in "hand" wherein the function can be considered as manual, and the system will operate continuously, the pressure within the receiver rising to the line pressure of the air provided to the system. Of course, the invention device cannot produce a pressure greater than the supply line pressure.

While the invention has been described in detail above, it is to be understood that this detailed description is by way of example only, and the protection granted is to be limited only within the spirit of the invention and the scope of the following claims.

I claim:

1. A machine for carrying out a pressure swing adsorption cycle for separating a selected gas out of a mixture of gases, said machine being built up of pre-assembled modules, said machine comprising a combined separation and control module adapted to output gas enriched in said selected gas, said combined separation and control module comprising at least one separation means adapted to separate said selected gas from said mixture, a pre-assembled valve and flow conduit module, means to mount said valve and flow conduit module on and in gas flow communication with said separation means, wherein said separation means comprises at least one pressure tank of generally elongated cylindrical configuration, and said tank comprising an inverted domed end member formed with a plurality of openings.

2. The combination of claim 1, and granular gas separation material substantially filling said at least one tank, said granular material being adapted to separate said selected gas out of said mixture of gases, whereby said inverted domed end and said openings serve as a funnel for filling said tank with said granular gas separation material.

3. The combination of claim 2, said machine comprising two of said granular material filled tanks, each of said tanks having one of said valve and flow conduit modules mounted thereon at a respective one end thereof, and a preassembled manifold module interconnecting said two valve and flow conduit modules.

4. The combination of claim 2, and a pre-assembled pipe and filter module comprising a pipe having a length a predetermined small amount shorter than the length of said tank, filter means pre-assembled at one end of said pipe, and means to connect the other end of said pipe to said respective one end of said tank in fluid flow communication with said valve and conduit module connected thereat.

5. The combination of claim 2, said granular gas separation material being selected from the group consisting of molecular sieves, silica gels, carbon, carbon based materials, and certain oxides.

6. The combination of claim 1, said separation and control module comprising housing means enclosing the control means of said machine, said housing means comprising a housing and a lid, means to removably mount said lid on said housing in an air-tight manner, means to deliver said mixture of gases to said separation means at a pressure greater than ambient atmospheric pressure, said housing being formed with an opening communicating the space inside said housing with the ambient atmosphere, and said separation and control module comprising means to vent gases other than said selected gas inside said housing, whereby the space inside said housing is at a pressure greater than the pressure of said ambient atmosphere.

7. The combination of claim 6, said machine comprising an automatic safety switch and means to mount said switch inside said housing.

8. The combination of claim 7, and a manually operated switch mounted on the outside of said housing connected to selectively override said automatic safety pressure demand switch.

9. The combination of claim 1, said machine also comprising an enriched gas tank module, means to deliver the selected gas enriched gas from said separation and control module to said tank module, and bracket means for readily removably mounting said tank and said separation and control modules to each other.

10. A machine for carrying out a pressure swing adsorption cycle for separating a selected gas out of a mixture of gases, said machine comprising at least two preassembled modules, said modules comprising a combined separation and control module adapted to output gas enriched in said selected gas, said modules comprising an enriched gas tank module, means to deliver the selected gas enriched gas from said separation and control module to said tank module, and bracket means for readily removably mounting said tank and said separation and control modules to each other.

11. The combination of claim 10, wherein said separation and control module comprises at least one pressure tank of generally elongated cylindrical configuration, and granular gas separation material substantially filling said at least one tank, said granular material being adapted to separate said selected gas out of said mixture of gases.

12. The machine of claim 11, said machine comprising a third valve and flow conduit module on and in gas flow communication with said at least one pressure tank.

13. The combination of claim 12, said machine comprising two of said granular material filled tanks, each of said tanks having one of said valve and flow conduit modules mounted thereon at a respective one end thereof, and a pre-assembled manifold module interconnecting said two valve and flow conduit modules.

14. The combination of claim 11, and a pre-assembled pipe and filter module comprising a pipe having a length a predetermined small amount shorter than the length of said tank, filter means pre-assembled at one end of said pipe, and means to connect the other end of said pipe to said respective one end of said tank in fluid flow communication with said separation and control module.

15. The combination of claim 11, said tank comprising an inverted domed end member formed with a plurality of openings, whereby said inverted domed end and said openings serve as a funnel for filling said tank with said granular gas separation material.

16. The combination of claim 11, said granular gas separation material being selected from the group consisting of molecular sieves, silica gels, carbon, carbon based materials, and certain oxides.

17. The combination of claim 10, said separation and control module comprising housing means enclosing the control means of said machine, said housing means comprising a housing and a lid, means to removably mount said lid on said housing in an air-tight manner, means to deliver said mixture of gases to said separation means at a pressure greater than ambient atmospheric pressure, said housing being formed with an opening communicating the space inside said housing with the ambient atmosphere, and said separation and control module comprising means to vent gases other than said selected gas inside said housing, whereby the space inside said housing is at a pressure greater than the pressure of said ambient atmosphere.

18. The combination of claim 17, said machine comprising an automatic safety switch and means to mount said switch inside said housing.

19. The combination of claim 18, and a manually operated switch mounted on the outside of said housing connected to selectively override said automatic safety pressure demand switch.

20. A machine for carrying out a pressure swing adsorption cycle for separating a selected gas out of a mixture of gases, said machine comprising at least one pre-assembled module comprising a combined bed and control module adapted to output gas enriched in said selected gas, said combined bed and control module comprising at least one separation means adapted to separate said selected gas from said mixture of gases, said bed and control module comprising housing means enclosing the control position of said at least one bed and control module, said housing means comprising a housing and a lid, means to removably mount said lid onto said housing in an airtight manner, means to deliver said mixture of gases to said separation means at a pressure greater than ambient atmospheric pressure, said housing being formed with an opening communicating the space inside said housing with the ambient atmosphere, and said separation and control module comprising means to vent gases other than said selected gas inside said housing, whereby the space inside said housing is at a pressure of said ambient atmosphere.

21. The combination of claim 20, said machine also comprising a pre-assembled valve and flow conduit module, and means to mount said valve and flow conduit module on and in gas flow communication with said separation means.

22. The combination of claim 21, wherein said separation means comprises at least one pressure tank of generally elongated cylindrical configuration, and granular gas separation material substantially filling said at least one tank, said granular material being adapted to separate said selected gas out of said mixture of gases.

23. The combination of claim 22 said machine comprising two of said granular material filled tanks, each of said tanks having one of said valve and flow conduit modules mounted thereon at a respective one end thereof, and a preassembled manifold module interconnecting said two valve and flow conduit modules.

24. The combination of claim 22, and a pre-assembled pipe and filter module comprising a pipe having a length a predetermined small amount shorter than the length of said tank, filter means pre-assembled at one end of said pipe, and means to connect the other end of said pipe to said respective one end of said tank in fluid flow communication with said valve and conduit module connected thereat.

25. The combination of claim 22 said tank comprising an inverted domed end member formed with a plurality of openings, whereby said inverted domed end and said openings serve as a funnel for filling said tank with said granular gas separation material.

26. The combination of claim 22, said granular gas separation material being selected from the group consisting of molecular sieves, silica gels, carbon, carbon based materials, and certain oxides.

27. The combination of claim 21, said machine also comprising an enriched gas tank module, means to deliver the selected gas enriched gas from said separation and control module to said tank module, and bracket means for readily removably mounting said tank and said separation and control modules to each other.

28. The combination of claim 20, said machine comprising an automatic safety switch and means to mount said switch inside said housing.

29. The combination of claim 28, and a manually operated switch mounted on the outside of said housing connected to selectively override said automatic safety pressure demand switch.

30. A machine for carrying out a pressure swing adsorption cycle for separating a selected gas out of a mixture of gases, said machine comprising at least one preassembled module comprising a combined bed and control module adapted to output gas enriched in said selected gas, said combined bed and control module comprising at least one separation means adapted to separate said selected gas from said mixture, said separation means comprising at least one pressure tank of generally elongated cylindrical configuration, granular gas separation material substantially filling said at least one tank, said granular material being adapted to separate said selected gas out of said mixture of gases, and said tank comprising an inverted domed end member formed with a plurality of openings, whereby said inverted domed end and said openings serve as a funnel for filling said tank with said granular gas separation material.

31. The combination of claim 30, said granular gas separation material being selected from the group consisting of molecular sieves, silica gels, carbon, carbon based materials, and certain oxides.

32. The combination of claim 30, said machine also comprising a pre-assembled valve and flow conduit module, and means to mount said valve and flow conduit module on and in gas flow communication with said separation means.

33. The combination of claim 32, said machine comprising two of said granular material filled tanks, each of said tanks having one of said valve and flow conduit modules mounted thereon at a respective one end thereof, and a preassembled manifold module interconnecting said two valve and flow conduit modules.

34. The combination of claim 32, and a pre-assembled pipe and filter module comprising a pipe having a length a predetermined small amount shorter than the length of said tank, filter means pre-assembled at one end of said pipe, and means to connect the other end of said pipe to said respective one end of said tank in fluid flow communication with said valve and conduit module connected thereat.

35. The combination of claim 32, said tank comprising an inverted domed end member formed with a plurality of openings, whereby said inverted domed end and said openings serve as a funnel for filling said tank with said granular gas separation material.

36. The combination of claim 30, said bed and control module comprising control means and housing means enclosing said control means, said housing means comprising a housing and a lid, means to removably mount said lid onto said housing in an air-tight manner, means to deliver said mixture of gases to said separation means at a pressure greater than ambient atmospheric pressure, said housing being formed with an opening communicating the space inside said housing with the ambient atmosphere, and said bed and control module comprising means to vent gases other than said selected gas inside said housing, whereby the space inside said housing is at a pressure greater than the pressure of said ambient atmosphere.

37. The combination of claim 36, said machine comprising an automatic safety switch and means to mount said switch inside said housing.

38. The combination of claim 36, and a manually operated switch mounted on the outside of said housing connected to selectively override said automatic safety pressure demand switch.

39. The combination of claim 30, said machine also comprising an enriched gas tank module, which includes said at least one pressure tank as part of said separate tank module, means to deliver the selected gas enriched gas from said bed and control module to said tank modules, and bracket means for readily removably mounting said tank and said separation and control modules to each other.

* * * * *